United States Patent [19]

Livick

[11] Patent Number: 4,685,496
[45] Date of Patent: Aug. 11, 1987

[54] ACCESSORY TOOL FOR HAND ROUTERS

[76] Inventor: Lester R. Livick, 15106 Beatty St., San Leandro, Calif. 94579

[21] Appl. No.: 835,753

[22] Filed: Mar. 3, 1986

[51] Int. Cl.⁴ ............................. B27C 5/10; B27C 1/20
[52] U.S. Cl. ............................... 144/134 D; 33/27.04; 144/1 F; 144/136 C; 409/180; 409/182
[58] Field of Search ............................ 33/27.04, 27.05; 409/180, 182, 241; 144/134 D, 136 C, 144 R, 137, 1 G, 1 E, 1 F

[56] References Cited

U.S. PATENT DOCUMENTS

| 2,752,961 | 7/1956 | Melgaard | 144/134 D |
| 3,635,268 | 1/1972 | Lange | 144/134 D |
| 4,044,805 | 8/1977 | Gronholz | 144/134 D |
| 4,099,552 | 7/1978 | Dybail | 144/1 F |
| 4,290,719 | 9/1981 | Worthington | 144/134 D |
| 4,294,297 | 10/1981 | Kieffer | 144/134 D |

FOREIGN PATENT DOCUMENTS 542165  3/1956  Italy .................................. 144/134 D Primary Examiner—W. D. Bray
Attorney, Agent, or Firm—Linval B. Castle

[57] ABSTRACT

A woodworking router accessory tool having a rectangular router base member having rollers in the bottom-for easy rolling against a straight edge for linear cutting. An adjustable length radius bar attaches to the base member for circle cutting, and longitunal straight frame member that closely retains the base member and its attached router for safe, long, precision routing. In addition, a short rectangular frame to which the base member may be attached permits both very short radius cuts and a guide fence.

11 Claims, 15 Drawing Figures

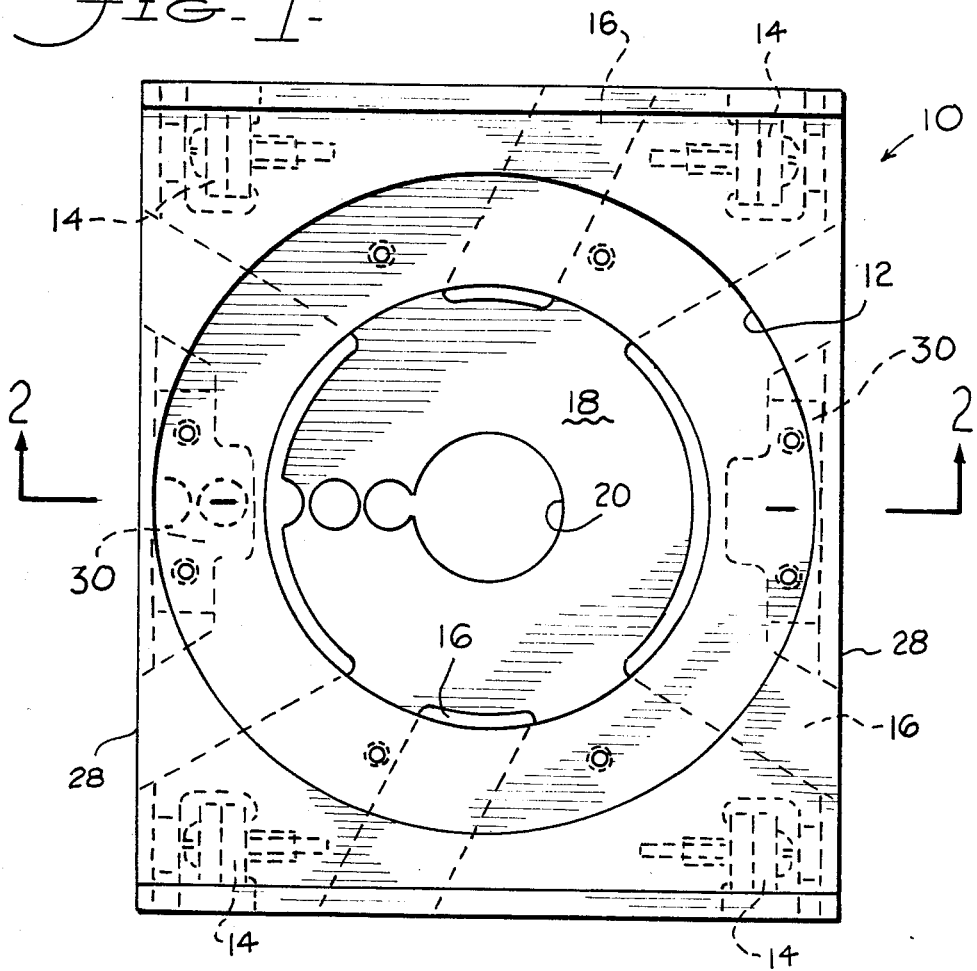
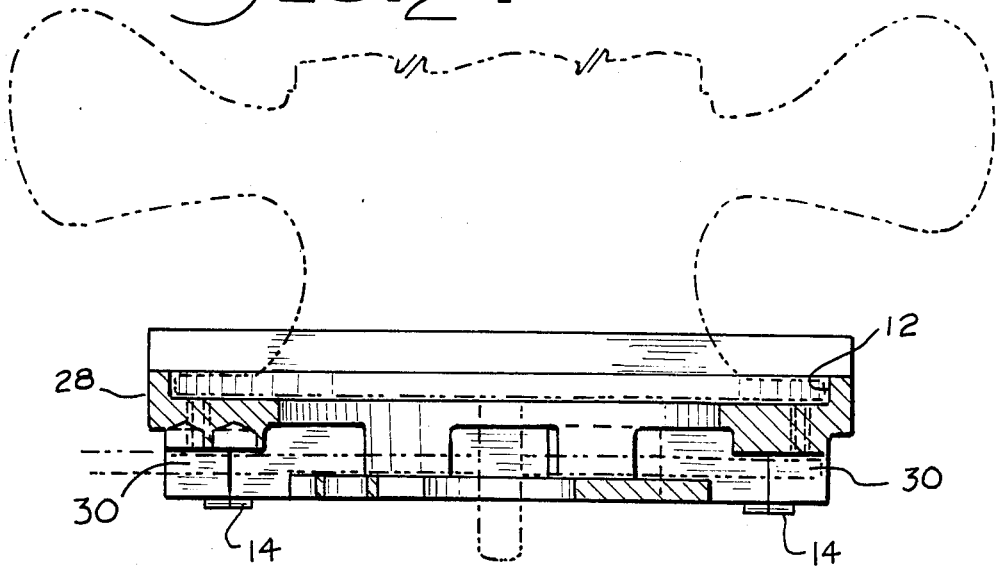

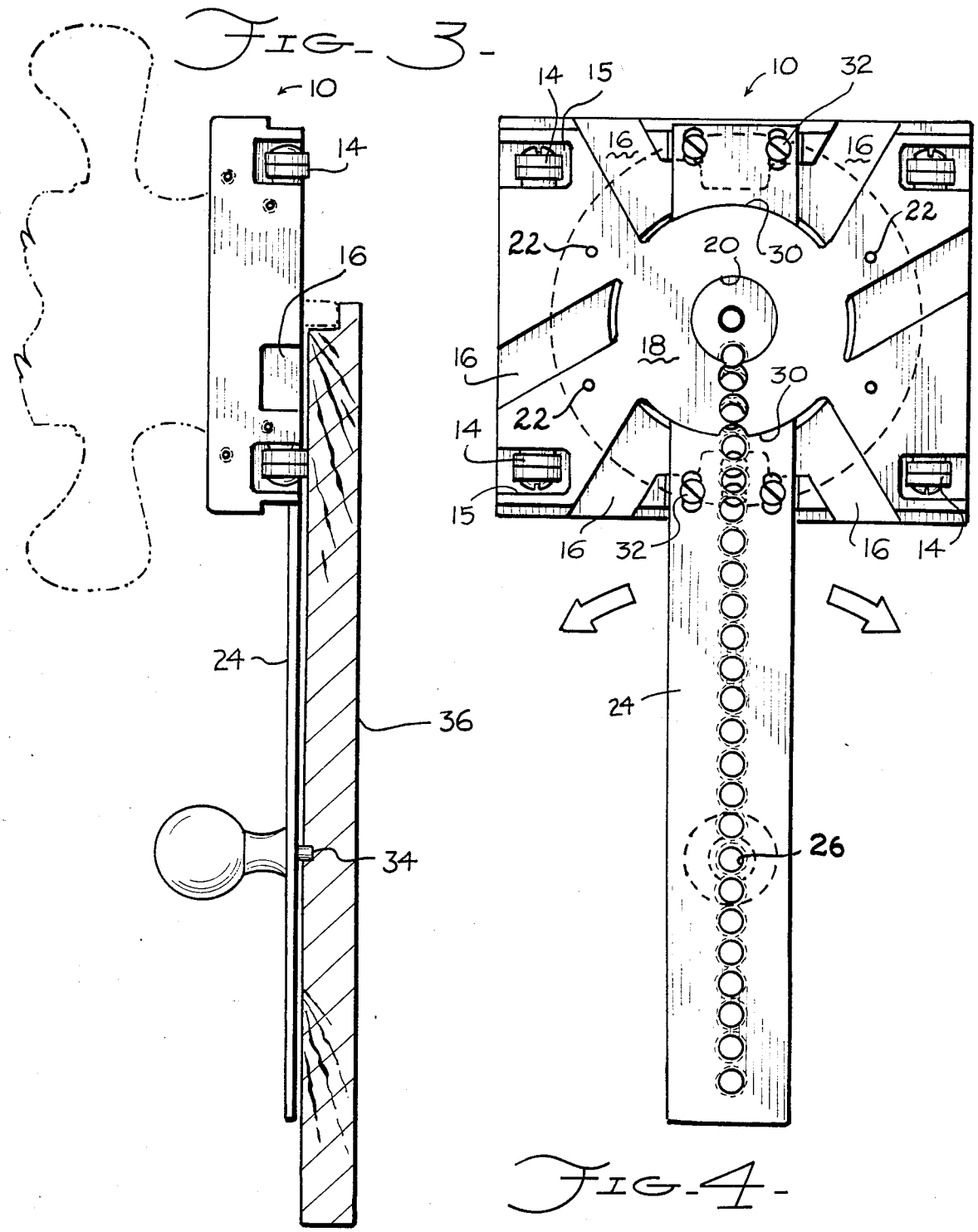

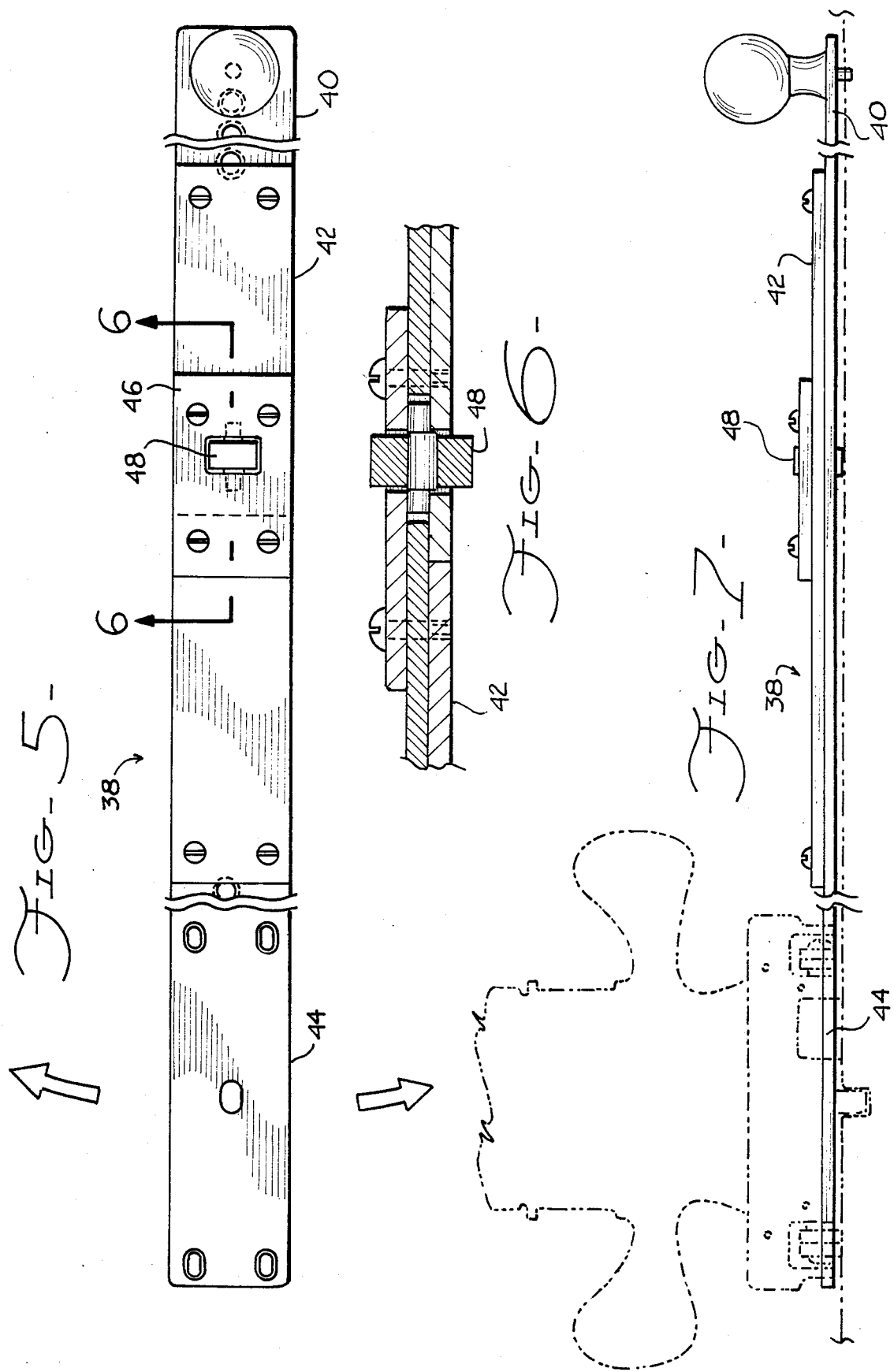

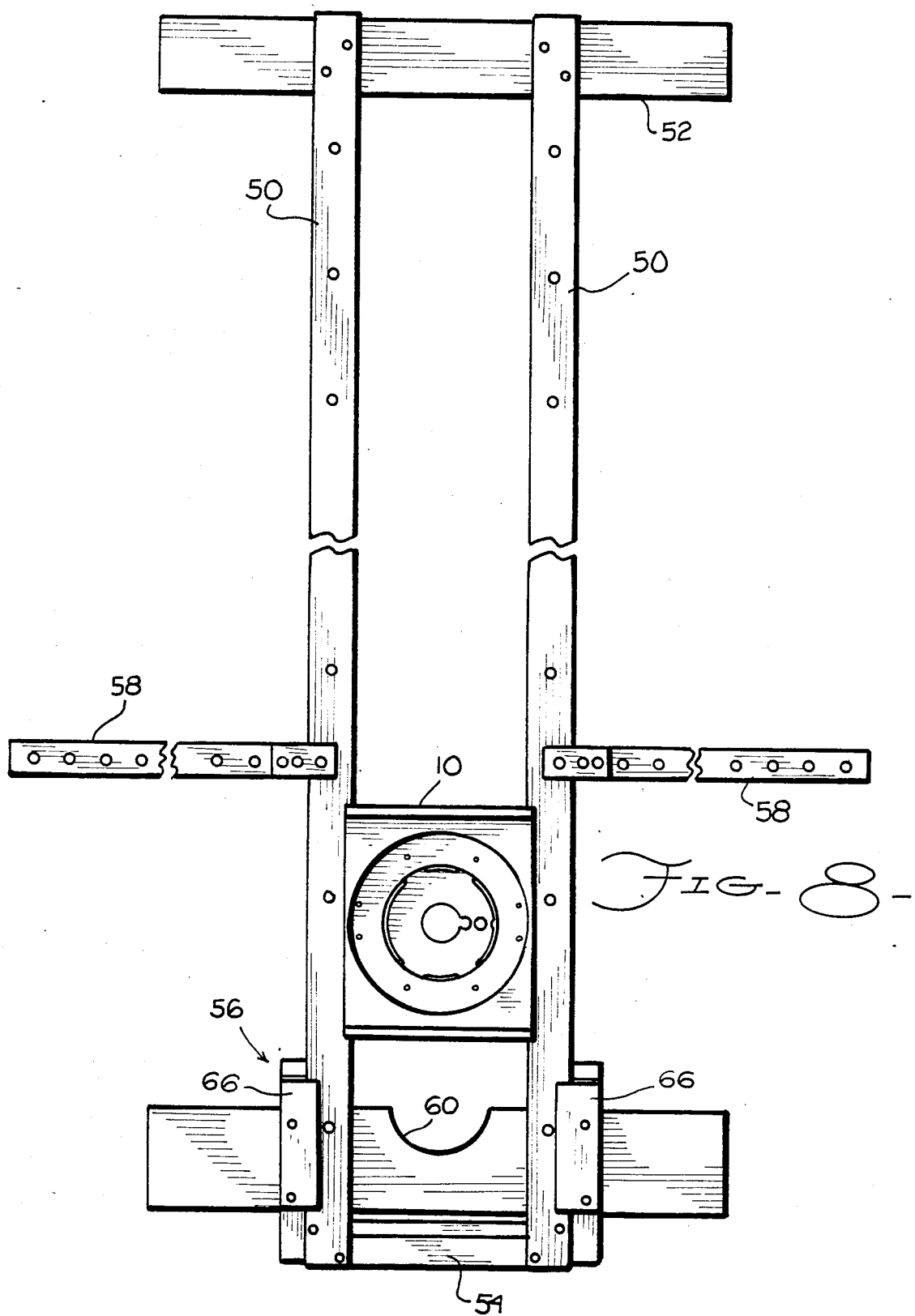

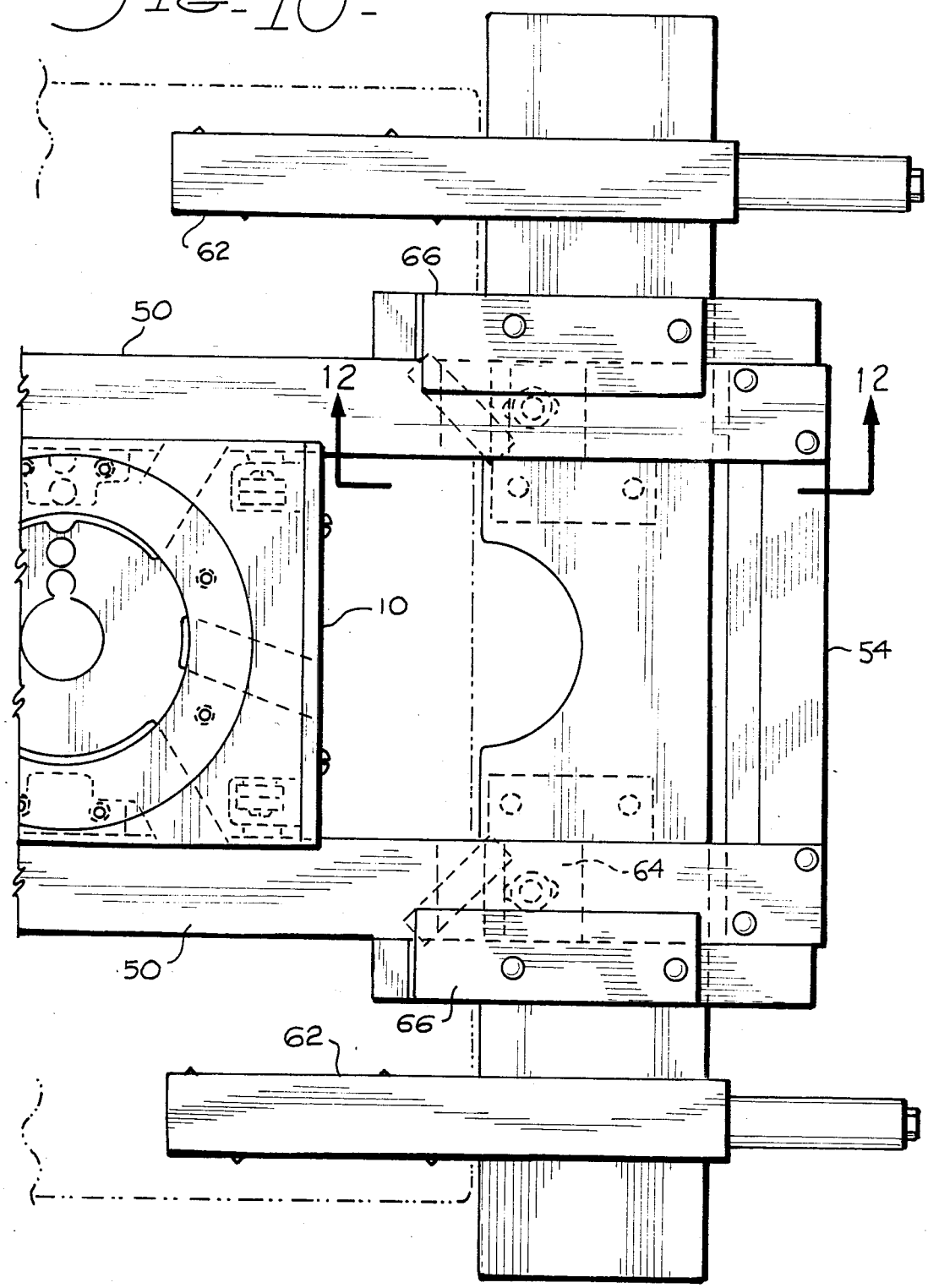

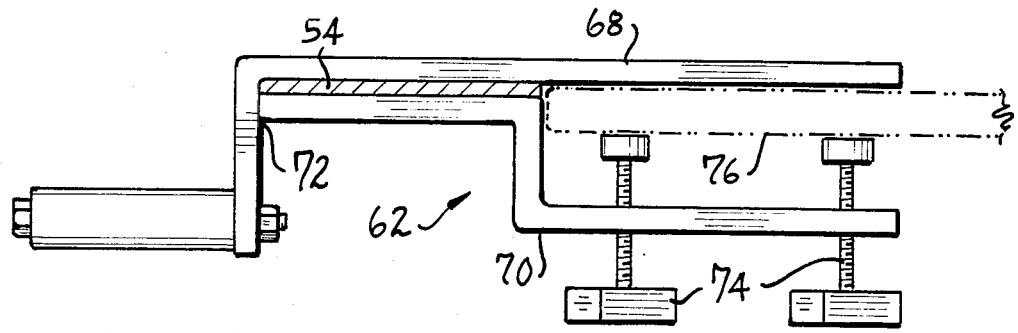
FIG-11-
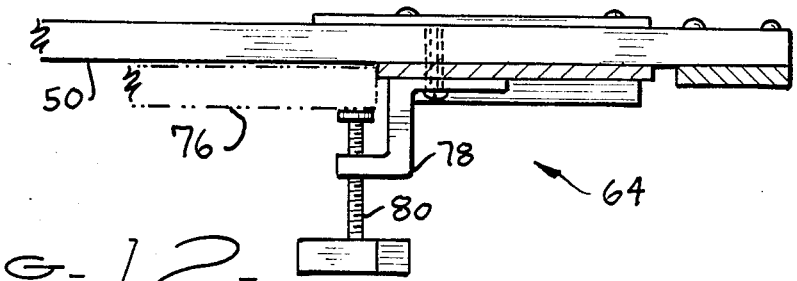
FIG-12-
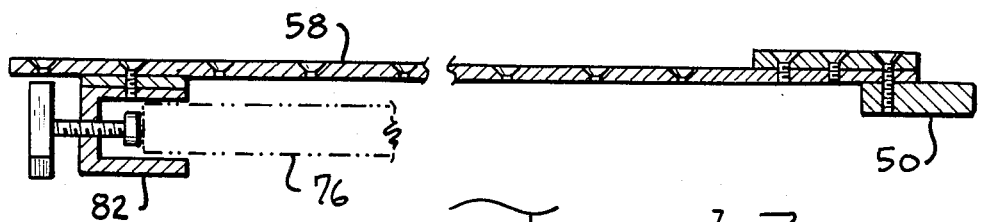
FIG-13-

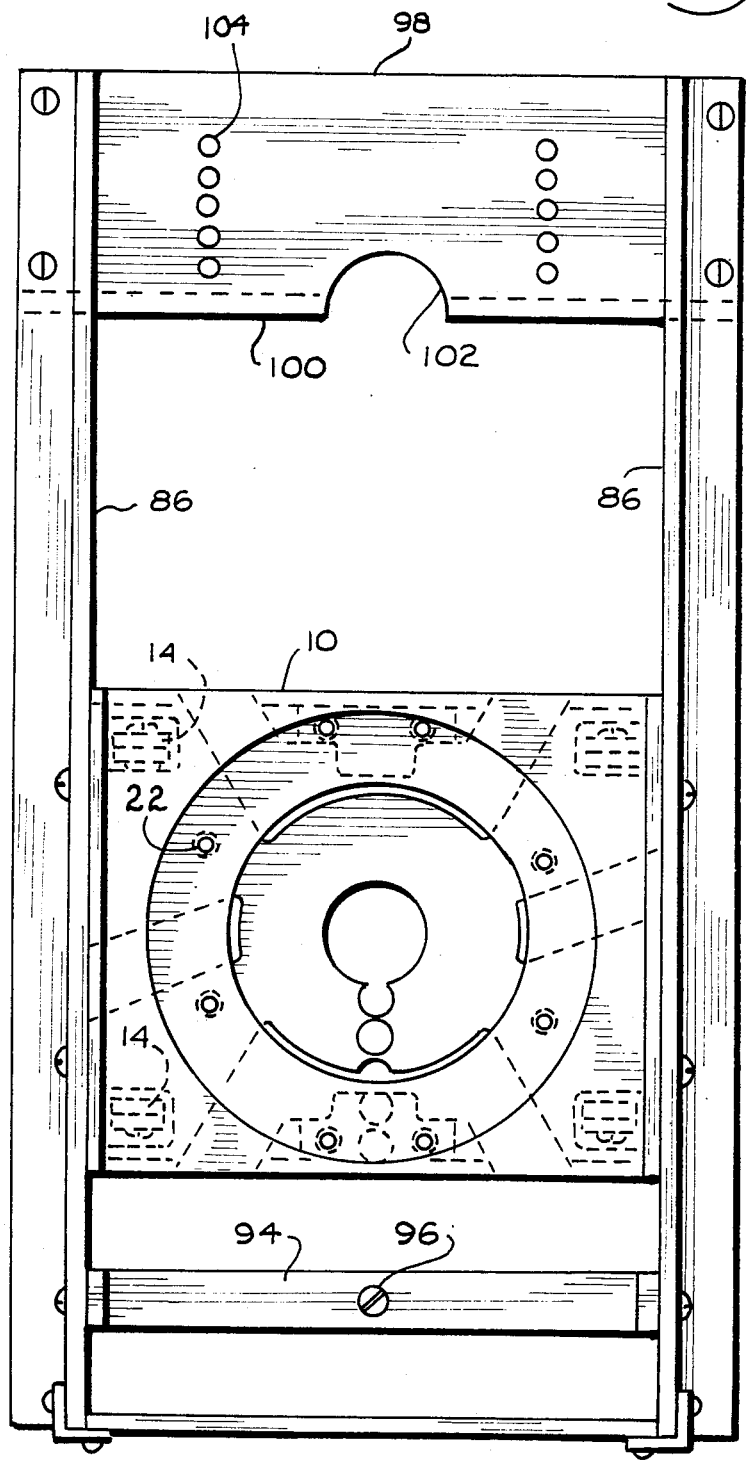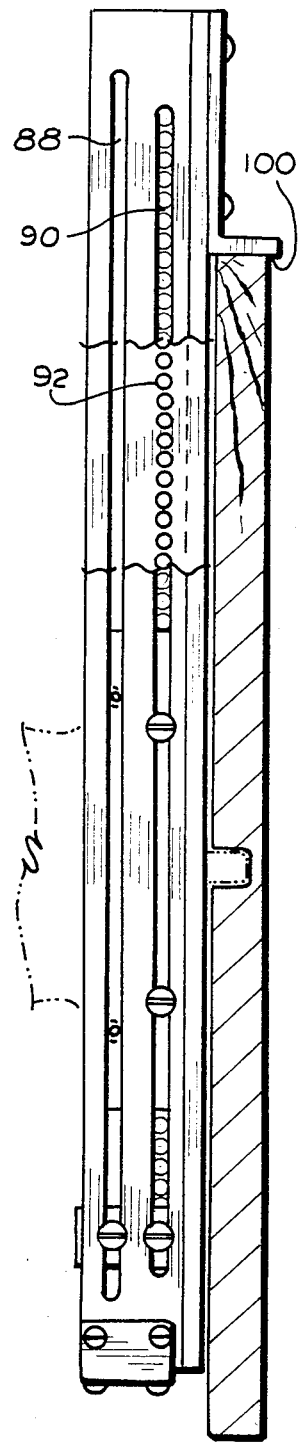
FIG-15-
FIG-14-

ACCESSORY TOOL FOR HAND ROUTERS

BRIEF SUMMARY OF THE INVENTION

This invention relates generally to hand tools and in particular to a novel accessory tool for an electric hand router for the accurate straight cutting on long materials and for cutting circles with diameters from about four inches to twenty feet or more.

The basic component of the accessory tool dscribed herein is a rectangular base unit to which a router is firmly attached with the router's rotatable spindle vertically centered therein so that a vertical cutting tool may extend downward through an opening in the bottom surface of the base unit. Ball bearing wheels are recessed in the bottom surface of the base near its corners to permit linear motion of the router along a long accessory track, or arcuate movement of the base unit and router when a adjustable radius beam is attached the base unit.

The router mounted rectangular base unit may be used for linear cutting by the use of any linear fence, or is preferably confined in a parallel fence accessory which snugly and very safely holds the unit against any possible side movement, thereby making the router completely safe for use by the handicapped. The parallel fence accessory to be described includes clamps which very firmly hold the work to be cut at both ends and along long sides thereof.

For cutting of small diameter arcs or circles, the rectangular base unit may be mounted within a elongated rectangular frame having an center point selectably adjustable from about two inches to twelve inches from the router spindle. For large arcs or circles, the abovementioned long radius beam is attached to the base unit. To prevent damage to the work piece, ball bearing wheels are mounted in the long radius beam for rolling upon the surface of the work piece.

The principal object of the invention is to provide safety accessories for high speed electric hand routers.

Another object of the invention is to provide means that safely confine an electric hand router and the work to be cut while permitting precision and safe cutting operations.

Other objects and advantages of the invention will become apparent from the following specifications and drawings.

BRIEF DESCRIPTION OF THE DRAWING

In the drawings which illustrate the preferred embodiment of the invention:

FIG. 1 is a top plan view of the rectangular base unit for an electric router;

FIG. 2 is a sectional view taken along the lines 2—2 of FIG. 1 and illustrates the lower section of a typical router in dashed lines;

FIG. 3 is an edge view of the base unit illustrated with a short radius beam for circle cutting;

FIG. 4 is a bottom plan view of the rectangular base unit and radius beam of FIG. 3;

FIG. 5 is a top plan view of an elongated radius beam for cutting arcs or circles with very large diameters;

FIG. 6 is a detailed sectional edge view illustrating the positioning of a bearing wheel in the radius beam of FIG. 5;

FIG. 7 is a sectional edge view of the radius beam of FIG. 5;

FIG. 8 is a plan view of a parallel track accessory permitting a router mounted in the base unit of FIG. 1 to make long straight cuts in a workpiece or in abutting edges of two long workpieces;

FIG. 10 is a top plan view of the base unit in the parallel tracks of FIG. 8;

FIG. 11 is a detailed side view of one of the types of end clamps illustrated in FIG. 9;

FIG. 12 is a detailed side view of another type of end clamp illustrated in FIG. 9;

FIG. 13 is a detailed sectional view of a side clamp as shown in FIG. 8;

FIG. 14 is a plan view of the rectangular base unit mounted in an elongated rectangular frame member for making router cut arcs and circles having very small diameters to diameters of two feet; and FIG. 15 is a side view of the rectangular frame member illustrated in FIG. 14.

DETAILED DESCRIPTION OF THE PREFERRED EMBODIMENT

Figure 9:
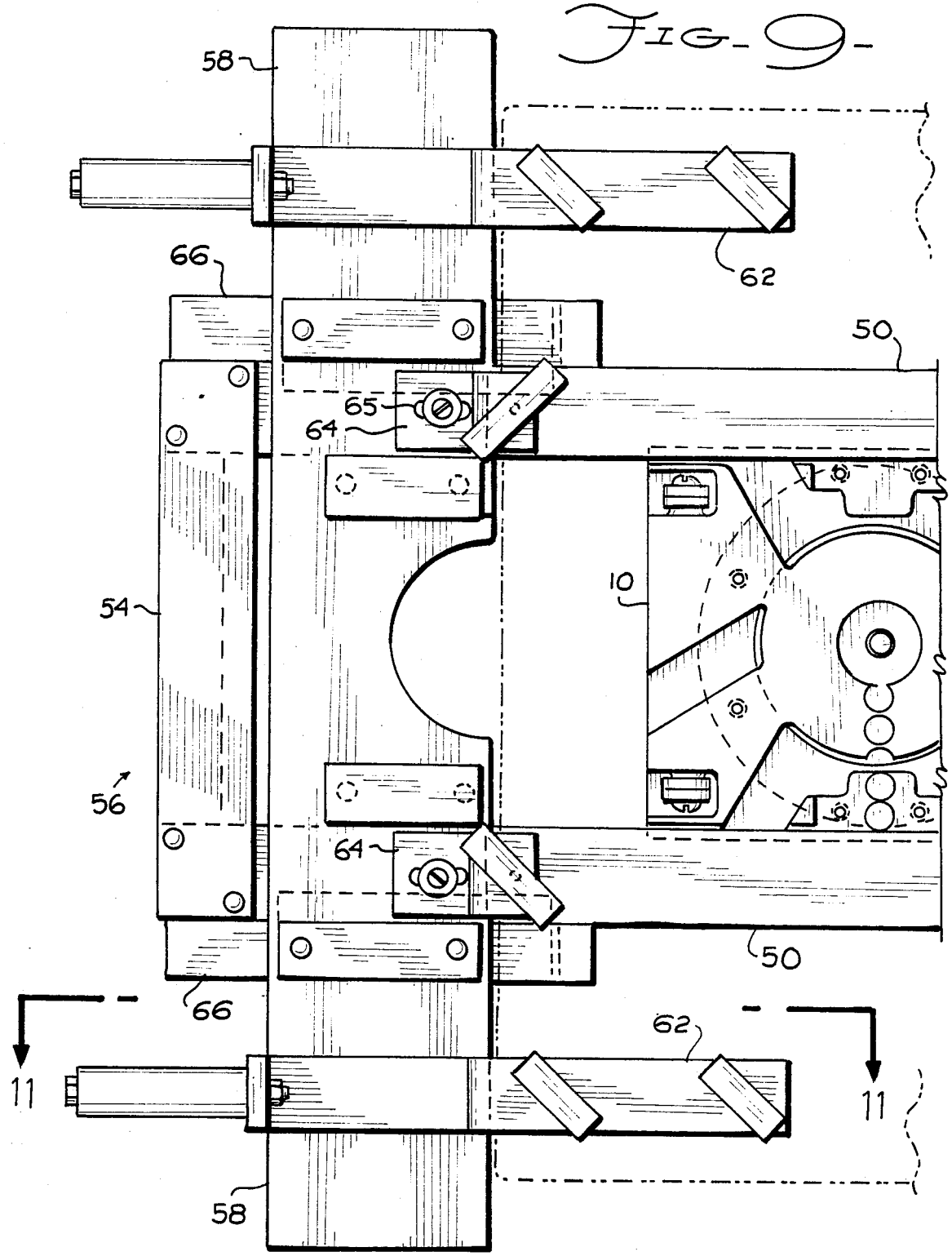
FIG. 9 is a bottom plan view of the rectangular base unit in the parallel track accessory of FIG. 8.

FIG. 1 is a top plan view illustrating a rectangular base unit 10 for supporting a conventional electrical router such as illustrated in broken lines in the sectional elevational view of FIG. 2. A conventional router has a circular base which will fit within the circular recess 12 in the base unit and is attached therein by machine screws to secure the router to its rectangular base.

Small diameter wheels 14 are mounted in recesses 15 in the bottom surface of the base unit 10 at each corner thereof. In the preferred embodiment, the wheels are small diameter ball bearings units that are mounted on lateral axes to extend slightly below the bottom surface of the base unit to thereby permit easy movement of the base and router on a work piece in a longitudinal direction. As best illustrated in the bottom plan view of FIG. 4, the bottom surface of the base unit is slotted to provide a plurality of conduits 16 for guiding the sawdust and chips from the router cutters. As shown in FIG. 4 the conduits 16 are carefully positioned to keep contaminating sawdust from the recesses containing the wheels 14 at the corners of the base unit.

As best illustrated in FIG. 4, a thin metal plate 18 forms the bottom of the base unit and has a large hole 20 that is coaxial with the outer spindle for accomodating the spindle and its cutting tool. Laterally and linearly extending outward from the spindle hole 20 are a plurality of equally spaced smaller holes 22 in the bottom plate 18. As will be subsequently explained in connection with FIG. 14, these smaller holes 22 cooperate with the large rectangular frame member of FIG. 14 to provide a small radius adjustments between the router spindle axis and a radius center point in the frame member for cutting small diameter arcs or circles.

As illustrated in FIG. 1, the long or longitudinal sides 28 of the rectangular base 10 are straight and raised to form a fence which may be used with a straight edge for manually guiding the router in making straight cuts in a workpiece.

The rectangular base 10 contains a lateral slot 30 for inserting therein, parallel with the axes of the base wheels 14, an elongated rectangular radius beam 24 between the body of the base unit 10 and the bottom plate 18 as best shown in FIG. 4. The radius beam 24, used for cutting relatively large arcs or circles, is adjustably attached through longitudinal slots to the base unit by machine screws 32 and contains a plurality of small equally spaced holes along its centerline for selectively attaching a radius center point 26 which may be a small metal pin 34 with handle attached to the workpiece 36 as shown in FIG. 3. It will be noted that the radius beam 24 is parallel with the axes of rotation of the base unit's corner wheels 14 so that the router and base unit easily roll on the surface of the workpiece as they are rotated about the center point 26 in the cutting of arcs or circles.

The radius beam may be of any convenient length and may be extended to lengths of ten feet or more as illustrated in FIGS. 5-7. As the length of a radius beam is extended, it will have the tendency to sag into a rubbing contact with the workpiece. To prevent marring the workpiece surface, a long radius beam formed by interconnecting a plurality of shorter beams 40 and 42 to a beam 44 connected to the base unit, preferably has a section 46 near the center of the beam that is provided with a rotatable wheel 48 mounted on an axis parallel with the longitudinal axis of the beam as shown in the detailed drawing of FIG. 6. the wheel extends below the bottom surface of the radius beam section 42 and rides on the surface of the workpiece to thereby lift the beam from the workpiece to prevent damage thereto. The use of such a long wheel-supported radius beam assures that accurate arcuate cuts may be made with safety to both the workpiece and router operator.

FIG. 8 is a plan view illustrating the rectangular base unit 10 mounted in a longitudinal guide for cutting long, accurate, straight cuts i workpieces such as doors and long panels, or for simultaneously cutting abutting edges of adjoining pairs of such workpieces. The longitudinal guide includes two parallel tracks 50 which, in the preferred embodiment are rectangular metal bars approximately ten feet in length and spaced so that the router rectangular base unit 10 may longitudinally roll between them on its corner wheels 14. The bars are rigidily held apart at a first end by a cross member 52 and at the second end by a second cross member 54. A clamping head assembly 56 is slideably mounted to the second end of the longitudinal guide as will be explained in connection with FIGS. 9-13. Further workpiece clamping is provided by the side clamps illustrated in FIG. 13 which are attached to the laterally extending arms 58 that are attachable to the parallel tracks 50 at any one of plurality of tapped holes along the length of the tracks. The side clamps are provided to adjust and secure a workpiece and particularly adjoining workpiece pairs for router cuts along the abutting edges.

The base unit 10 is accurately held between the tracks 50 and rolls easily on its corner wheels as router cuts are being made. The longitudinal guide therefore assures accurate and very straight router cuts with complete safety to the operator.

FIG. 9 is a bottom plan view and FIG. 10 is a top plan view of the second end of the longitudinal guide of FIG. 8 and particularly illustrates the details of the clamping head assembly 56 which includes a wide lateral plate member 58 three to four feet in length. A semicircular cut 60 is formed at the center edge of the plate member and opens toward the router base unit 10 to permit the base unit to move the router spindle closer to the second end of the longitudinal guide. The long length of the lateral plate member 58 accomodates the clamps 62, illustrated in FIG. 11, which may be positioned along the length of the plate member to secure a very wide workpiece or pair of abutting workpieces from lateral movement.

A second pair of workpiece clamps 64, illustrated in FIG. 12, is adjustably attached to the bottom of the lateral plate member 58 at a location below the longitudinal tracks 50, as shown in FIGS. 9 and 10. These clamps are used to further secure workpieces near the position of the router cutter and prevent cutting chatter or vibrations which may cause cutting inaccuracies. As shown in FIG. 9, these clamps 64, are secured to the lateral plate member 58 by machine screws passing through longitudinal adjustment slots 65 in the base of the clamps and into threaded holes in the longitudinal tracks 50.

As shown in FIG. 8 and in greater detain in FIGS. 9 and 10, the head assembly 56 further includes adjustment members 66 clamped together about the exterior edges of the longitudinal tracks 50 to permit longitudinal adjustment of the head assembly 56 with respect to the tracks 50. The adjustment members 66 further operate to secure the spacing the tracks at the second end and, when so secured, the second end cross member 54 may be temporarily removed if necessary to extend the operational length of the tracks to accomodate longer router cuts in which the router spindle may extend deeper into the semicircular opening 60.

FIGS. 11, 12 and 13 illustrate the details of the various clamps used with the longitudinal guide of FIGS. 8-10. The clamp 62 of FIG. 11 comprises an "L" shaped top member 68 and an underlying "Z" shaped member 70 welded or otherwise attached to the member 68 at the points 72, both members loosely sandwiching the cross member 54 to permit lateral sliding of the clamp 62 along the cross member. Clamping screws 74 are located in the "Z" shaped member 70 and engage the end of a workpiece 76 against the bottom surface of the top member 68 to prevent longitudinal movement of the workpiece.

The clamp 64 of FIG. 12 is comprised of a "Z" shaped member 78 having in one leg a machine screw for adjustably securing the clamp to the cross member 56 and through the elongated slots 65 into a threaded hole in the tracks 50, the second leg of the clamp having a threaded hole for receiving a clamping screw 80 for securing a workpiece 76 against the bottom surface of the tracks 50.

The clamp illustrated in FIG. 13 includes side arms 58, one end of which may be screwed to a track 50 as previously explained in connection with FIG. 8. A "U" shaped clamp 82 having a clamp screw 84 located in the center portion thereof is screwed into any one of a plurality of positions along the side arm 58 and operates to engage the edge of a workpiece 76 and urge it toward the track 50. The clamp of FIG. 13 is thus used to force together and adjust the positions of two abutting panels so that a router cut may be accurately made at their adjacent edges.

FIGS. 14 and 15 are plan and side views of a rectangular frame accessory used for cutting small diameter arcs and circles with a router. The frame includes a pair of parallel rails 86 spaced apart for receiving the router base member 10 with the rotational axes of its corner wheels 14 parallel with the rails. In the preferred embodiment, the rails 86 are made of angle stock with two long longitudinal slots 88 and 90 cut through each vertical side wall to provide longitudinal adjustment means for the router base member 10. If desired, one of the longitudinal slots, such as slot 90, may be replaced with a long series of closely spaced screw holes 92 for providing fixed adjustment positions for the base member 10. Also engaging the slots or screw holes in the rails 86, and longitudinally adjustable therein, is a cross bar 94 having a centrally located pivot a 96 indicating the center of an arc or circle to be cut.

A removable end piece 98 bridges the end of the frame opposite the cross bar 94 and has a depending edge 100 which may be used as a fence for making straight router cuts as shown in FIG. 15. A semicircular opening 102 is formed in the center edge of the end piece 98 for accomodating the router cutting when extending the radius of a cut or if it is desired to lock the base member 10 at the extreme end of the frame and adjust the longitudinal position of the cross bar 94. For further adjustment of the base member 10 with respect to the end piece 98 two parallel series of spaced holes 104 in the end piece are aligned with the holes 22 in the base member 10 so that the two members may be screwed together. The frame member of FIGS. 14 and 15 may thus be used with the router base member 10 as a straight cutting fence, or with the pivot 96 in the cross member 94 for making arcuate cuts with a relatively short radius of between approximately three inches to twelve inches.

Having thus described my invention, what I claim is:

1. An accessory tool for electrical hand routers comprising:
   a rectangular base unit having first parallel side edges, second parallel side edges, a bottom surface and a top surface, said top surface having therein a recess for receiving the base of an electrical hand router and an opening in said recess and extending through said base unit for receiving a router spindle and cutting member;
   a plurality of rotatable wheels, one of said plurality being mounted adjacent each corner of said rectangular base unit, each of said wheels being mounted on an axis parallel with first parallel side edges of said base unit and having rolling surfaces extending below said base unit bottom surface; and
   a plurality of discharge slots formed in said base unit between the router spindle opening and the exterior of said base unit for the discharge of dust and shavings generated by the router in a direction away from any of said rotatable wheels.

2. The accessory tool claimed in claim 1 wherein said rectangular base unit includes a second slot through said base unit and substantially parallel with the bottom surface thereof for receiving a radius beam for providing a center of rotation for arcuate router cuts, said second slot being parallel with said first parallel edges of said rectangular base unit and with the rotational axes of said plurality of wheels.

3. The accessory tool claimed in claim 2 further including a radius beam insertable in said second slot and having one end thereof attachable to said rectangular base unit, said radius beam having along its length a plurality of spaced holes, each being selectable as a center of rotation of said base unit and a router associated therewith.

4. The accessory tool claimed in claim 3 wherein said radius beam includes surface separating means for suspending said beam above and out of contact with the surface of an underlying workpiece.

5. The accessory tool claimed in claim 4 wherein said surface separating means includes a wheel mounted for rotation on an axis parallel with the longitudinal axis of said radius beam and having a rolling surface extending below said radius beam for rolling contact with a workpiece top surface.

6. The accessory tool claimed in claim 1 further including an elongated guide member for longitudinal cutting by a router mounted in said base unit, said guide member including a pair of parallel tracks, positionable over the surface of a workpiece and spaced from each other by a distance equal to the spacing of the first parallel edges of said rectangular base unit for retaining said base unit with the axes of its corner wheels perpendicular to said tracks.

7. The accessory tool claimed in claim 6 wherein the parallel tracks of said elongated guide member are interconnected at each end by an end member, one of said ends having a clamping head assembly secured thereto for supporting workpiece clamp members for securing workpieces to said elongated guide member.

8. The accessory tool claimed in claim 7 wherein said elongated guide member includes side edge clamping members attachable to said parallel tracks and extending outward from each of said tracks at selected distances for urging together, and for adjusting the position of, abutting edges of coplanar workpiece pairs.

9. The accessory tool claimed in claim 7 wherein said clamping head assembly is longitudinally adjustable along at least a portion of said parallel tracks.

10. The accessory tool claimed in claim 1 further including an elongated rectangular frame member having a pair of parallel rails spaced to receive therein the first side edges of said rectangualr base unit, the side rails of said frame member having at least one longitudinal slot for adjustably securing said base unit and for adjustably securing a cross bar having therein a center pivot point for router cutting arcs and circles with small radii.

11. The accessory tool claimed in claim 10 wherein one end of said elongated rectangular frame member is interconneted by a removable lateral angle member having one leg thereof extending below said frame member to provide a workpiece fence.

* * * * *